April 26, 1949.  C. C. FUERST  2,468,702
SHUTTER RELEASING MECHANISM
Filed Jan. 12, 1946

CARL C. FUERST
INVENTOR

BY
ATTORNEYS

Patented Apr. 26, 1949

2,468,702

UNITED STATES PATENT OFFICE 2,468,702

SHUTTER RELEASING MECHANISM

Carl C. Fuerst, Rochester, N. Y., assignor to Eastman Kodak Company, Rochester, N. Y., a corporation of New Jersey Application January 12, 1946, Serial No. 640,711

9 Claims. (Cl. 95—63)

My invention relates to photography and more particularly to camera shutters of the between-the-lens type. One object of my invention is to provide a simple type of shutter which is capable of obtaining relatively high-speed exposures. Another object of my invention is to provide a shutter of the type described in which a simplified form of shutter setting and tripping mechanism is used. A further object of my invention is to provide a shutter in which a single lever is used and is movable in one direction for setting the shutter and in a reverse direction for tripping the shutter. A further object of my invention is to provide a shutter tripping mechanism in which only extremely light pressure is required on the shutter tripping lever to actuate the shutter. Still another object of my invention is to provide a shutter blade tripping mechanism which is simple and efficient and other objects will appear from the following specification, the novel features being particularly pointed out in the claims at the end thereof.

This shutter is for an improvement over the shutter shown in my Patent 2,382,623 for automatic shutter granted August 14, 1945. In accordance with this patent, the shutter mechanism is shown which employs a somewhat similar blade drive mechanism but differs in that the shutter is of the automatic type. It is also an improvement over my copending application, Serial No. 614,041, Setting shutter drive, filed September 1, 1945, resulting in Patent 2,410,649, granted November 5, 1946. The shutter shown in Patent 2,382,623 includes a completely manual release of the master member instead of the semiautomatic manual release of the present application. The shutter trigger is movable in one direction for both setting and tripping the shutter mechanism and is movable in an opposite direction through an idle stroke. While such a shutter is entirely suitable for exposures which do not exceed 1/150 of a second for the highest speed, it is difficult if not impossible to obtain high speeds with such a shutter because it is undesirable to use a very powerful spring since this spring must be set and its energy suddenly released during movement of the trigger in a single direction. When the energy is suddenly released there may be a tendency for the shutter to shake just at the moment when a picture is being made. This, of course, is not true where a comparatively light operating spring is employed. It is desirable to have some form of setting if the shutter is to operate smoothly at relatively high speeds. This may be done as shown in Patent 2,410,649.

My improved shutter may be considered as an improvement and a simplification of my high-speed shutter shown in my copending application, Serial No. 595,033, for Photographic shutter, filed May 21, 1945, now Patent No. 2,448,876, dated September 7, 1948. The above application is a continuation in part of an original application, Serial No. 549,529, for Photographic shutter, filed August 15, 1944, now abandoned. In this high-speed shutter application I have provided a semiautomatic shutter releasing mechanism in that I provide a spring driven shutter tripping member. This shutter tripping member is held by a latch when set, and the setting movement occurs when the master member is set. By depressing a manually operable member which may be accomplished with light pressure, the latch releases the spring driven shutter actuator so that it, in turn, releases the master member to make an exposure. This movement is desirable for a number of reasons, one of which is that it requires only the lightest pressure on the shutter trigger to make an exposure.

My present application is for a variation of this method which is still simpler in construction and yet which has many of the benefits of the semiautomatic shutter release. My present shutter is provided with a spring driven release, but the construction is simplified by the use of a single latch member which holds both the master member and the shutter tripping member against movement until a hand-operated member starts the latch member to move, the movement being completed by the spring driven tripping member. Thus, the number of parts used in my high-speed shutter application has been reduced, and the construction has been simplified as applied to my present simple type of shutter. I might point out, however, that in my high-speed shutter, the shutter blades move in only one direction to open and close the exposure aperture and thus are capable of extremely high-speed exposures from 1/800 to 1/900 of a second exposure whereas in my present simplified shutter the blades move in one direction to open the exposure aperture and in a reverse direction to close the exposure aperture so that this construction does not permit such high speeds, but nevertheless I am able to obtain an exposure of between 1/400 and 1/500 of a second with the mechanism which will be hereinafter more fully described.

Coming now to the drawings wherein like reference characters denote like parts throughout:

Figure 1:
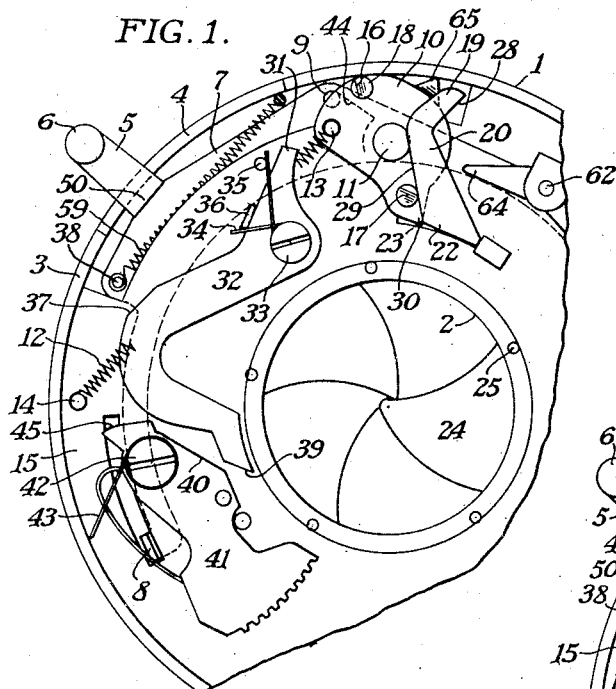
Fig. 1 is a fragmentary top plane view showing a preferred embodiment of my improved shutter mechanism, the parts being shown in a normal position of rest in which the master member is not under operating tension.
Figure 2:
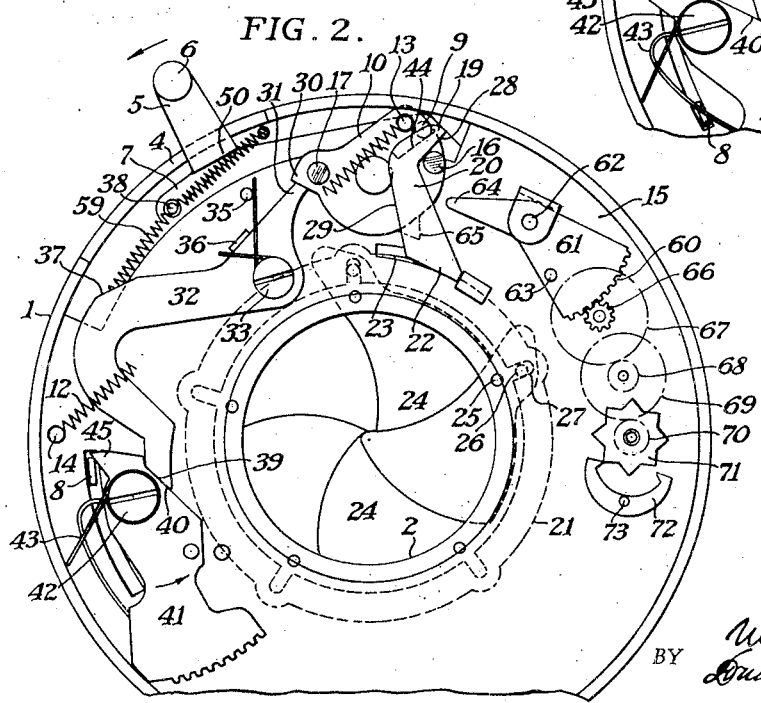
Fig. 2 is a view similar to Fig. 1 showing the shutter parts in the position they assume after the shutter has been set and has been conditioned for exposure.

My shutter may consist of a shutter casing, referred to broadly as 1, this shutter casing having a central exposure opening 2 and having an upstanding flange 3 extending around the outer edge of the shutter casing. The flange 3 may be recessed at 4 so that a manually operable lever 5 may extend to the outside of the shutter casing, this lever preferably terminating in an operating handle 6. As best shown in Fig. 1, the lever 5 may include a generally arcuately shaped portion 7 terminating in an upturned flange 8 on one end and including an upwardly extended pin 9 on the opposite end. The lever 5 may move between the positions shown in Figs. 2 and 3. In Fig. 2 the shutter is set and in Fig. 3 the shutter is released, these two movements being accomplished by moving the handle 6 first in a clockwise direction for setting and second in a counterclockwise direction to initiate the release.

This shutter includes a master member 10 pivotally mounted upon a stud 11 carried to one side of the exposure opening 2. A spring 12 is attached to a pin 13 carried by the master member and to a second pin 14 carried by the mechanism plate 15. This spring always tends to turn the master member in a counterclockwise direction. There are two pins carried by the master member 10, one of which 16 is the opening pin, and the other of which 17 is the closing pin. The opening pin 16 has a beveled surface 18 so that in setting this beveled surface may ride under the end 19 of an arm 20 which is the blade ring operating arm.

Referring to Fig. 2 the blade ring operating arm 20 is connected to the blade ring 21, the arm being bent at 22 so that it may pass down through a slot 23 in the mechanism plate 15. Each shutter blade 24 is pivotally mounted as at 25 to the shutter casing 1, and there is a pin 26 and slot 27 connection between the blade ring and each blade to form an operative connection therebetween. When the shutter blade ring is oscillated, the shutter blades open and close to make an exposure.

The blade ring arm 20 is somewhat hook shaped and carries two surfaces 28 and 29 which surfaces are positioned to be engaged by the pins 16 and 17 carried by the master member 10. The opening pin 16 may engage the surface 28 and will ride up this surface until it slips off the extreme end 19 of the arm. This point is nearly reached in Fig. 3. As soon as the pin 16 slips off the end of the arm 20 pin 17 moves until it strikes the surface 29 of the arm 20 driving this arm in a clockwise direction to close the shutter blades, the extreme closed position being shown in Fig. 1. I have found it desirable to make the surfaces 28 and 29 at an angle to each other. This angle may vary somewhat with the design of the shutter, but I prefer to have this angle such that each of these surfaces is substantially radial to the pivot 11 of the master member 10 so that when engaged by the driving pins the arm will be smoothly driven and the pins may strike the surfaces 28 and 29 which are substantially radially arranged with respect to the pivot.

The arm 20 extends away from the blade ring 21 so that its center of rotation is the center of the shutter casing. Since the center of rotation of the master member is to one side of the center of rotation of the arm 20, I have found that with the embodiments shown in the drawings an angle of approximately 60° produces quite satisfactory results. Obviously this angle is by way of illustration since it may be altered considerably according to the location of the master member with respect to the shutter.

In order to latch the master member in an operative position, it is provided with a latch element 30, this latch element being engaged by a latch element 31 carried by the latch member 32. This latch is pivoted 33 to the mechanism plate 15 and a spring 34 engaging a pin 35 on the mechanism plate, and a lug 36 on the latch 32 tends to turn this latch in a clockwise direction to engage the latch elements 30—31. The latch element 32 carries a cam surface 37, this lying partially in the path of a pin 38 projecting upwardly from the manually operable member 7. Thus, when the pin 38 is moved in a counterclockwise direction, it may engage the cam surface 37 to move the latch element 32. However, the position of the cam surface, the pivoted point 33 of the latch, and the path of movement of the pin 38 is such that while the latch 32 is moved, this movement is insufficient to release the latch elements 30—31.

The latch element 32 has a cam 39 which preferably has an arcuate surface extending substantially circumferentially of the latch pivot 33 and which is engageable with a cam surface 40 on a shutter tripping element 41. The cam surface 40 may be complemental in shape, if desired, to the cam surface 39 although entirely satisfactory results may be obtained by having the cam 40 a straight line cam, if desired. This tripping element is carried by a stud 42 and a spring 43 encircling the stud 42 tends to turn the shutter tripping element 41 in the direction shown by the arrow in Fig. 2. When the shutter has been set, which occurs when the pin 9 on the manually operable member 7 engages a flange 44 on the under side of the master member and moves the master member to its set position as shown in Fig. 2, the cam surfaces 39 and 40 are also engaged because the upturned flange 8 on the manually operable member engages the cam 45 on the shutter actuating member 41, and moves it to its tension position as also shown in Fig. 2. In this position the cam surfaces 39 and 40 constitute a latch for holding the shutter tripping member 41 against movement. Thus, the latch 32 prevents both the master member 10 and the shutter tripping member 41 from moving when the parts are in their set position ready to make an exposure. However, the manually operable member 7 normally moves after release to an inactive position as shown in Fig. 1 and Fig. 2. In the latter position, the shutter is ready to make an exposure.

To make an exposure, the manually operable member 7 is moved through its handle 6 in the direction shown by the arrow against the pressure of the spring 50 thereby moving the pin 38 until this pin engages the cam 37 on the latch 32. This movement moves the latch 32, sliding the cam surface 39 from the cam surface 40 to such an extent that the latch elements 30 and 31 remain in contact and the master member does not move.

Figure 3:
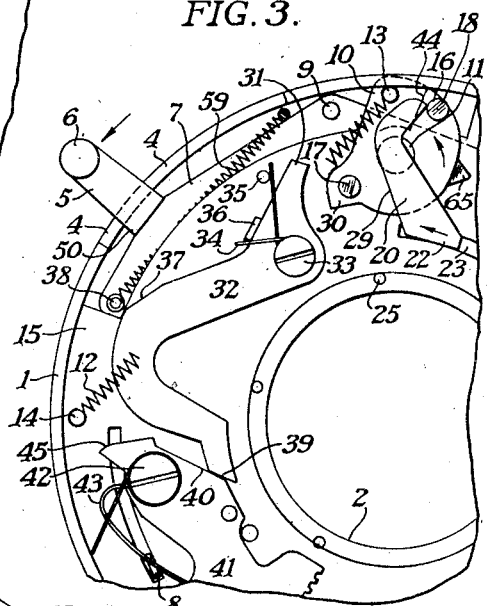
Fig. 3 is a view similar to the preceding figures, but with the parts in the position they assume just as the shutter blades open while an exposure is being made.

Thus, while the handle 6 initiates a shutter tripping movement, before the shutter can be tripped to make an exposure, the power operated shutter tripping member 41 must be released as by the movement above described after which the member 41 will continue to move the latch element 32 until the elements 30—31 are released, at which time the master member turns rapidly under the impulse of its spring 12 causing the pin 16 through engagement with the surface 28 to move the blade ring arm 20 until the pin 16 rides off the end 19 of the arm 20. When this occurs, the opening movement of the blades has been completed. Fig. 3 shows the parts just before the slip-off occurs. Continued movement of the master member 10 causes the closing pin 17 to strike the arm surface 29 driving the arm 20 in an opposite direction thus closing the exposure aperture 2.

The operation above described is for making the fastest exposures, but where a slower exposure is desired, a known type of retard designated broadly as 60 can be used. This retard may consist of a gear segment 61 pivoted at 62 and having an adjusting pin 63 which may be operated by a cam in a known manner. By moving the pin 63, the tail 64 of the gear segment 61 may be brought more or less into engagement with a lug 65 carried by the master member so that this lug will strike and rock the gear segment 60 according to its position. The movement of gear segment 61 is impeded through pinion 66, gear 67, pinion 68, gear 69, pinion 70 and starwheel 71. I also prefer to provide a pallet 72 which is pivoted at 73 and which may engage the starwheel. This gear train and its operation is not new.

From the above description, it will be seen that I have provided an extremely simple type of shutter mechanism in which the master member directly drives the shutter blades through a blade ring arm which overlies the master member and which is driven to both open and close the shutter blades by the opening pin 16 and the closing pin 17. I have provided a latch for simultaneously holding the master member and the shutter tripping member in a tension position, this latch also having a manually movable surface—the cam 37—lying partially in the path of movement of the manually operable member 7. Thus, when the manually operable member is moved and a pin carried thereby engages the cam 37, it moves the latch 32 a distance only sufficient to free the power operated trigger release 41 so that it may move under its own spring 43. Thus, movement of the latch started by the manually operable member is continued by the power operated releasing device 41, and the latch 32 continues to move until the master member 10 is released. This movement occurs very rapidly so that there is no noticeable lag between the time the handle 6 is pushed and the exposure is made. Since the trigger 6 is moving against the spring 50, which tends, with the spring 51, to hold the manually operable member in an idle position of rest, as shown in Fig. 2, it is only necessary to exert extremely light pressure on the handle 6 to release the shutter.

I claim:

1. A power-operated shutter release for shutters of the type including an apertured shutter casing, shutter leaves pivotally mounted in the casing to open and close the aperture, a blade ring operably connected to the blades for moving the blades, power means for operating the blade ring, a pivoted latch for said power means, and a trigger, said power-operated shutter release comprising a spring-operated pivoted member, means for setting the power-operated means for operating the blade ring and for setting the power-operated shutter release against spring pressure and into a position to engage the power means latch, the trigger being movable to engage and move the latch a limited distance, the power means latch and power-operated shutter release each having interengaging surfaces positioned relative to their respective pivots to have a latched position in which the latch prevents movement of the power-operated shutter release and an unlatched position in which the power-operated shutter release may drive the latch, the extent of movement of the trigger being sufficient to move the latch to its unlatched position with respect to the power-operated shutter release.

2. A power-operated shutter release for shutters as defined in claim 1 characterized by the interengaging complemental surfaces on the power-operated shutter release and latch lying substantially at right angles to a line drawn between their respective pivots, said surfaces releasing their latching engagement when one surface is moved to one side of the line drawn between their respective pivots.

3. A power-operated shutter release for shutters as defined in claim 1 characterized by the interengaging complemental surfaces on the power-operated shutter release and latch lying substantially at right angles to a line drawn between their respective pivots, said surfaces releasing their latching engagement when one surface is moved to one side of the line drawn between their respective pivots, means for limiting the movement of the trigger relative to the latch for moving the latch from its latching engagement to a position in which the power-operated releasing member may move the latch to release the power-operated means for actuating the shutter blades.

4. A power-operated shutter release for camera shutters of the type including an apertured casing, mechanism for opening and closing the aperture for an exposure including a master member, a trigger, a power-operated shutter release and a pivoted lever having latches at both ends, a first end latch for engaging the master member to hold it in a set position, means for setting the master member, a second latch to engage the power-operated release to hold it in a set position, means for limiting the trigger movement relative to the latch to move to and from a latch-engaging and non-latching position, the second end latch contact with the power-operated shutter release being shiftable from a latching to a non-latching position from which latter position the power-operated shutter release may move and move the lever upon its pivot until said master member is released.

5. The power-operated shutter release as defined in claim 4 characterized by the latching position of the power-operated shutter release and the second end latch contact lying substantially on and transversely of a dead center line drawn between the pivot of the lever and the pivot of the power-operated shutter release whereby movement of the pivoted lever by the trigger past the dead center position to the non-latching position enables the power-operated shutter release to move the lever about its pivot to release the master member.

6. The power-operated shutter release as defined in claim 4 characterized by the pivoted lever including a short arm carrying a first latch element for engaging and holding master member in a set position, and including a long arm carrying a second latch element for engaging and holding the power-operated release in a set position and means carried by the trigger for moving the pivoted arm to a position in which the power-operated shutter release is no longer held against movement and from which the arm may be moved thereby to release the master member.

7. The power-operated shutter release as defined in claim 4 characterized by the pivoted lever including a short arm carrying a first latch element for engaging and holding master member in a set position, and including a long arm carrying a second latch element for engaging and holding the power-operated release in a set position and means carried by the trigger for moving the pivoted arm to a position in which the power-operated shutter release is no longer held against movement and from which the arm may be moved thereby to release the master member, the contacting surfaces on the power-operated shutter release and the pivoted lever having an arcuate shape extending substantially circumferentially of the latch pivot.

8. The power-operated shutter release as defined in claim 4 characterized by the pivoted lever including a short arm carrying a first latch element for engaging and holding master member in a set position, and including a long arm carrying a second latch element for engaging and holding the power-operated release in a set position and a cam on the long arm positioned in the path of the shutter trigger for moving the lever by the trigger.

9. The power-operated shutter release as defined in claim 4 characterized by the pivoted lever including a short arm carrying a first latch element for engaging and holding master member in a set position, and including a long arm carrying a second latch element for engaging and holding the power-operated release in a set position and the long arm of the lever carrying a cam extending into the path of the trigger a distance sufficient to move the lever by the trigger to release the power-operated release from its set position whreby said power-operated member may then move the lever to release the mechanism for opening and closing the aperture to make an exposure.

CARL C. FUERST.

REFERENCES CITED

The following references are of record in the file of this patent:

UNITED STATES PATENTS

| Number | Name | Date |
|---|---|---|
| 2,362,546 | Fuerst | Nov. 14, 1945 |
| 2,410,649 | Fuerst | Nov. 5, 1946 |